(12) United States Patent
Aldendeshe

(10) Patent No.: US 6,815,840 B1
(45) Date of Patent: Nov. 9, 2004

(54) HYBRID ELECTRIC POWER GENERATOR AND METHOD FOR GENERATING ELECTRIC POWER

(76) Inventor: Metaz K. M. Aldendeshe, c/o Orontes Corporation, 2600 Michelson Dr. 17th. Floor, Irvine, CA (US) 92612

(*) Notice: Subject to any disclaimer, the term of this patent is extended or adjusted under 35 U.S.C. 154(b) by 46 days.

(21) Appl. No.: 10/148,618

(22) PCT Filed: Nov. 17, 2000

(86) PCT No.: PCT/US00/31741

§ 371 (c)(1),
(2), (4) Date: May 31, 2002

(87) PCT Pub. No.: WO01/43272

PCT Pub. Date: Jun. 14, 2001

Related U.S. Application Data

(60) Provisional application No. 60/169,592, filed on Dec. 8, 1999.

(51) Int. Cl.[7] .............................. H02P 9/04; F02H 11/06
(52) U.S. Cl. ...................... 290/1 R; 290/40 C; 290/1 A
(58) Field of Search ................................. 290/1 R, 1 A, 290/40 C, 52, 4 R; 60/409, 415, 404; 318/778; 180/302; 417/364

(56) References Cited

U.S. PATENT DOCUMENTS

| | | | | |
|---|---|---|---|---|
| 3,379,008 A | * | 4/1968 | Manganaro | 180/302 |
| 3,842,333 A | * | 10/1974 | Boese et al. | 322/35 |
| 3,870,942 A | * | 3/1975 | Boese et al. | 322/35 |
| 3,967,132 A | * | 6/1976 | Takamine | 290/4 R |
| 4,158,145 A | * | 6/1979 | Kartsounes et al. | 290/52 |
| 4,206,608 A | * | 6/1980 | Bell | 60/698 |
| 4,311,917 A | * | 1/1982 | Hencey et al. | 290/1 A |
| 4,342,921 A | * | 8/1982 | Williams | 290/2 |
| 4,437,015 A | * | 3/1984 | Rosenblum | 290/1 R |
| 4,490,619 A | * | 12/1984 | McMinn | 290/2 |
| 4,525,631 A | * | 6/1985 | Allison | 290/4 R |
| 4,612,447 A | * | 9/1986 | Rowe | 290/1 R |
| 4,827,152 A | * | 5/1989 | Farkas | 307/68 |
| 4,843,250 A | * | 6/1989 | Stupakis | 290/53 |
| 5,242,278 A | * | 9/1993 | Vanderslice et al. | 417/364 |
| 5,495,128 A | * | 2/1996 | Brammeier | 290/55 |
| 5,553,454 A | * | 9/1996 | Mortner | 60/409 |
| 6,054,838 A | * | 4/2000 | Tsatsis | 320/101 |
| 6,326,703 B1 | * | 12/2001 | Clark | 290/52 |
| 6,349,787 B1 | * | 2/2002 | Dakhil | 180/302 |
| 6,534,958 B1 | * | 3/2003 | Graber et al. | 322/11 |
| 6,615,118 B2 | * | 9/2003 | Kumar | 701/19 |

* cited by examiner

*Primary Examiner*—Joseph Waks
*Assistant Examiner*—Julio Gonzalez R.
(74) *Attorney, Agent, or Firm*—Edward E. Roberts

(57) ABSTRACT

A system for generating electric power comprises an electrically driven air compression unit (10), a high-pressure storage tank (14) and a hydraulic system. The hydraulic system comprises a fluid reservoir (20), a pneumatically driven fluid pump (18) and a hydraulic motor (26), having a drive shaft (28) rotatably coupled to an electric generator (8). Initially a high-speed compression unit (10) is operated by an outside electric source. The air is compressed into the high-pressure storage tank (14) and controllably released into the pneumatically driven fluid pump (18), causing its operation. Hydraulic fluid being pressured from the fluid reservoir (20) into the hydraulic motor (26) causes the rotation of the motor drive shaft (28) and the electric generator (8). Electric power is generated. The outside electric source is removed. Part of the generated power is used to operate the compression unit (10) the other part of the power is used by a load.

13 Claims, 1 Drawing Sheet

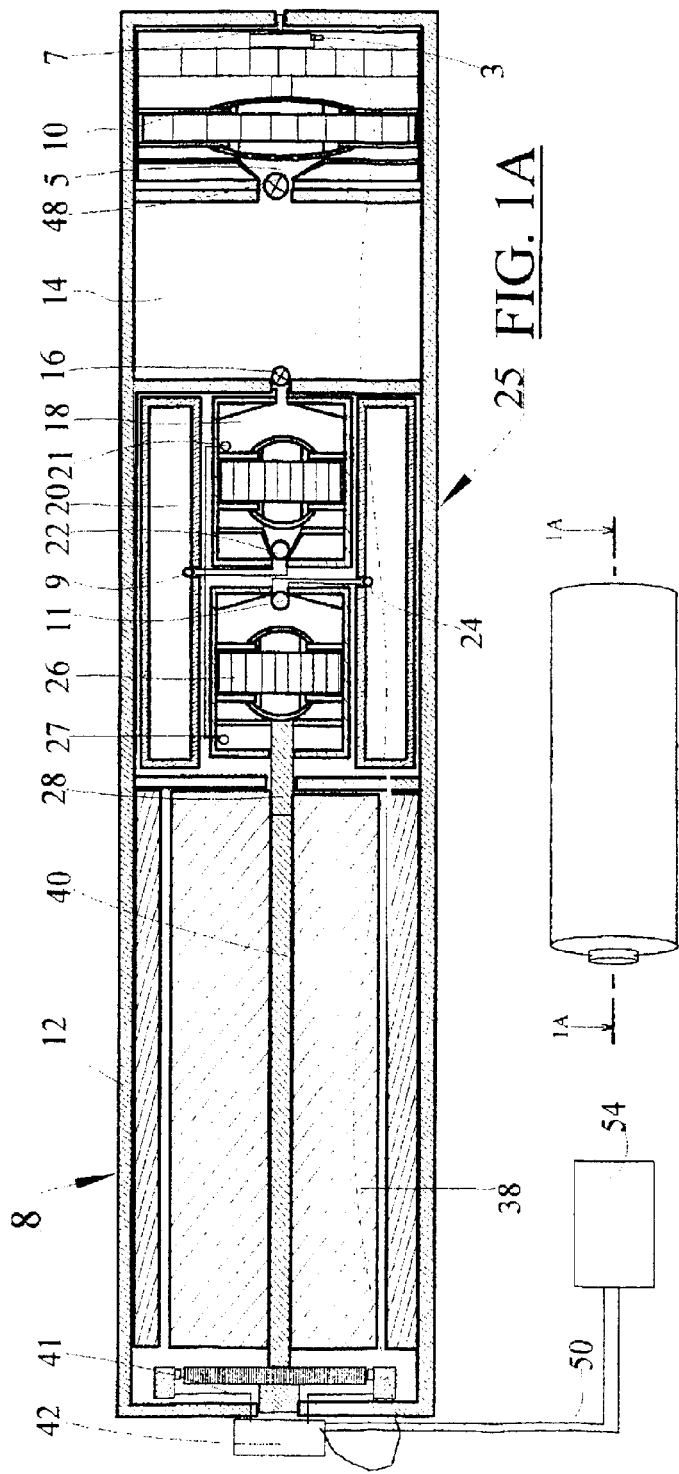
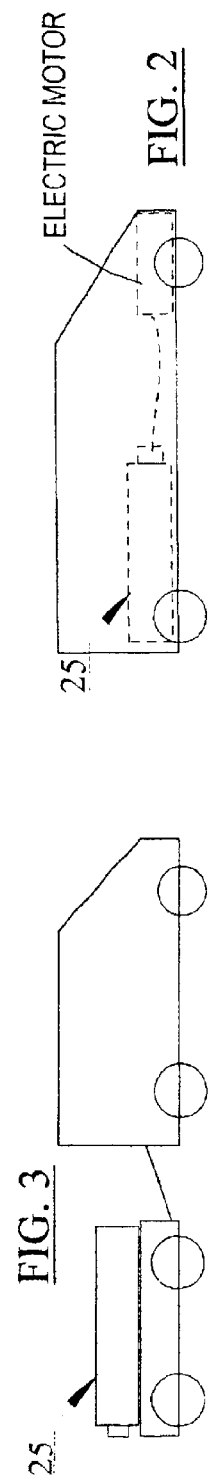
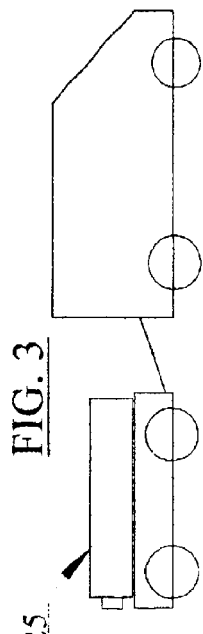

HYBRID ELECTRIC POWER GENERATOR AND METHOD FOR GENERATING ELECTRIC POWER

This application claims benefit of provisional application 60/169,592 filed Dec. 8, 1999.

The present invention relates generally to an electric generator, more particularly to a hybrid electric generator.

For nearly 100 years electric power has been typically produced by generators in electric power plants. These generators are verb massive and require the construction of large facilities to operate. The technology to drive these generators is as old as the electric generator itself. It relies on the expenditure of huge amount of expensive polluting and environmentally disruptive nonrenewable resources such as: hydroelectric power, fossil fuel and nuclear energy. Hydroelectric power plants require building of massive dams on rivers, that are proven to be disruptive to flora and fauna habitat and cause ecological imbalances dial have disastrous effects on the eco system. Using fossil fuels such as coal, petroleum and natural gas, power plants pollute air and produce greenhouse effect gases, which are the cause of multitude human diseases, ecological accidents and catastrophic environmental problems. The struggle to control and secure the fossil fuels energy resources has been the cause of numerous social, political, economic and war upheavals throughout the $20^{th}$ century. Power plants utilizing nuclear fuels produce harmful radioactive wastes. Nuclear waste storage is one of the major problems facing us today. Its effect on the environment of the future is not known yet, but most experts forecast dire consequences. Other means of producing electric power are by small portable or mobile generators. These are driven by internal combustion engines. The operation of these engines depends on valuable resources of fossil fuels that produce air pollution.

An advantage of the present invention is that it generates electrical power economically and without producing environmental hazards. It utilizes non-combustible clean and free high-pressure compressed air to generate valuable electrical energy. Another advantage is the portability of the system of the present invention. It is transportable electrical energy that will electrically power motorized automobiles, crafts and various machinery. Most importantly and unlike batter charged systems, high-pressure air, compressed by high-speed compressor into a storage tank, will operate large electric generators in the megawatt range.

Accordingly, the invention provides in a first aspect a hybrid electric power generator, comprising:
 a) air compression means having an air outlet connected to a storage tank storing compressed air;
 b) a hydraulic system comprising a fluid reservoir, a pneumatically driven fluid pump having an air inlet connected to said storage tank air outlet and a fluid outlet connected to said fluid reservoir, a hydraulic motor having a fluid inlet connected to the fluid outlet of said fluid reservoir and having a fluid outlet connected to said pneumatically driven fluid pump fluid inlet, said hydraulic motor having a rotating drive shaft;
 c) an electric generator rotatably driven by said hydraulic motor having electrical output leads, one of the leads is connected to the electrical input of said air compression means.

Preferably, the hybrid power generator further comprises an electrical regulator and wherein said electric generator is a direct current electric generator or an alternating current electric motor.

According to a second aspect of the invention there is provided a hybrid method for generating electric power comprising:
 a) air compression means having an air outlet connected to a storage tank storing compressed air;
 b) a hydraulic system comprising a fluid reservoir, a pneumatically driven fluid pump having ail air inlet connected to said storage tank air outlet and a fluid outlet connected to said fluid reservoir, a hydraulic motor having a fluid inlet connected to the fluid outlet of said fluid reservoir and having a fluid outlet connected to said pneumatically driven fluid pump fluid inlet, said hydraulic motor having a rotating drive shaft;
 c) an electric generator rotatable driven by said hydraulic motor having electrical output leads, one of the leads is connected to the electrical input of said air compression means.

BRIEF DESCRIPTION OF THE DRAWINGS

FIG. 1 is a view of the present invention.

FIG. 1A is an elevational sectional drawing of the preferred embodiment of the present invention, when viewed from 1A—1A direction of FIG. 1

FIG. 2 shows the present invention as an electric power source to drive a vehicle.

FIG. 3 shows the present invention as a transportable unit.

LIST OF REFERENCE NUMERALS UTILIZED IN THE DRAWINGS 3-electrical input lead
7-other electrical input
5-air outlet
8-electric generator
9-reservoir fluid inlet
10-air compression unit
11-motor fluid inlet valve
12-housing structure
14-pressurized air storage tank
16-fluid pump air inlet
18-hydraulic fluid pump
20-fluid reservoir
21-hydraulic pump fluid inlet
22-hydraulic pump fluid outlet
24-reservoir fluid outlet
25-system of the present invention
26-hydraulic motor
27-motor fluid outlet valve
28-drive shaft
38-regulator output lead
40-armature shaft
41-electrical output lead
42-electrical regulator
48-air compressor inlet valve
50-another electrical lead
54-electrical load It is an object of the present invention to provide an electric generator, which generates electrical power economically and without producing environmental pollution. The system comprises an electrically driven air compressor, having an air outlet connected to a high-pressure storage tank. The air released from the storage tank enters a pneumatically driven fluid pump in a hydraulic system. The hydraulic system comprising a fluid reservoir, a pneumatically driven fluid pump and a hydraulic motor, having a drive shaft rotatably coupled to an electric generator.

Initially the system of the present invention is operated by an outside electric source. Once the system is sufficiently rotated, the outside source can be removed. High-pressured air released into the pneumatically driven fluid pump causes the rotation of the hydraulic motor and attached to it the drive shaft. A generator is rotatably coupled to the drive shaft. When the generator is sufficiently rotate s electric power is generated. Part of the generated power is used to operate the electrically driven air compression unit, the other part is used by a load. In the preferred embodiment of this invention one of the generator electrical outputs is connected to a regulators that has its electrical outputs connected to a load. The entire assembly is covered by a housing structure.

Other advantages and features of the present invention will become apparent from the following description, which refers to the accompanying drawings.

In FIG. 1A, an elevational sectional view of a system 25 of the present invention is shown according to the preferred embodiment, when viewed from 1A—1A direction of FIG. 1. System 25 comprises a housing structure 12 having a plurality of support planes. Securely mounted in the enclosure of housing structure 12 is an electrically driven air compression unit 10 having electrical inputs 3 and 7, an air outlet 5, that is connected to an air inlet valve 48 of a high pressure storage tank 14, containing air under high pressure. System 25 further comprises a hydraulic system that includes a fluid reservoir 20, a pneumatically driven fluid pump 18 and a hydraulic motor 26. Fluid reservoir 20 has a fluid inlet 9 and a fluid outlet 24. Pneumatically driven fluid pump 18 having an air inlet 16, a fluid outlet 22, connected to fluid reservoir fluid inlet 9, and a fluid inlet 21, connected to a hydraulic motor fluid outlet 27. Hydraulic motor 26 having a fluid inlet 11 connected to fluid reservoir outlet 24 and a drive shaft 28 rotationally coupled to an armature shaft 40. System 25 further comprises an electric generator 8, having an electrical output lead 41 electrically connected to an electric regulator 42. The regulator has an electrical lead 38, used to electrically operate air compression unit 10, and an electrical lead 50, used by a load 54.

The operation of the present invention according to the preferred embodiment will now be described. The operation of system 25 is cyclic. Initially the present invention is operated by an outside electric source, connected to electrical inputs 7, so that high-speed compression unit 10 is operated and air is compressed into high-pressure storage tank 14. The storage tank is cylindrically shaped and composed of a metal material, such as titanium steel of sufficient strength to contain pressurized air at a pressure approximating 2500 pound per square inch (p.s.i.). When air pressure inside the storage tank reaches the predetermined level, and capacity of storage tank 14 is full, the outside electric source can be removed. High-pressured air is controllably released through air inlet 16 into pneumatically driven fluid pump 18, causing the operation of the fluid pump. Hydraulic fluid is pressured into the fluid reservoir through fluid inlet valve 22 and released under pressure through fluid outlet valve 24 into fluid valve 11 of hydraulic motor 26. Hydraulic fluid is pressured into hydraulic motor 26, causing the rotation of the motor drive shaft 28 and attached to it armature shaft 40 of generator 8. Electric power is generated. Hydraulic fluid is further pressured out of the hydraulic motor through outlet valve 27 back into pneumatically driven fluid pump 18 through inlet valve 21. The cycle is completed and continues.

In this preferred embodiment the generator electrical output lead 41 is connected to the electrical input of electrical regulator 42, that has its electrical output lead 50 used for consumption by load 54 and electrical output lead 38 used to electrically operate air compression unit 10.

The present invention can be stationary mounted on a base, or as shown in FIG. 3, transported by movable means, or as shown in FIG. 2,) used as a power source to drive motorized crafts and vehicles. The present invention is superior to a conventional power generator, and it is a superior system for generating electrical power economically and without producing environmental hazards.

What is claimed is:

1. A hybrid electric power system, comprising:

a) air compression means comprising an air compressor, a storage tank connected to said air compressor for receiving and storing compressed air in said storage tank, said storage tank having means for controllably releasing said compressed air;

b) a hydraulic system comprising a hydraulic fluid reservoir, a pneumatic driven hydraulic fluid pump operated by said compressed air from said storage tank to thereby provide pressurized hydraulic fluid to said fluid reservoir, and a hydraulic motor operated by said pressurized hydraulic fluid from said fluid reservoir to rotate a drive shaft, said hydraulic system further including means for providing regenerative hydraulic fluid back to said hydraulic fluid pump;

c) an electric generator rotatably driven by said drive shaft of said hydraulic motor, said electrical generator having electrical output leads, one of said leads connected to provide electrical power to said air compressor.

2. A hybrid electrical power system according to claim 1, further comprising an electrical regulator for regulating the output of said generator and wherein said electric generator is a direct current electric generator or an alternating current electric motor.

3. A hybrid method for generating electric power, comprising the steps of:

a) providing air compression means connected to a storage tank for storing compressed air therein, said storage tank having means for controllably releasing said compressed air therefrom;

b) providing a hydraulic system comprising a hydraulic fluid reservoir, a pneumatically driven hydraulic fluid pump connected to said storage tank and operated by said compressed air from said fluid reservoir, and a hydraulic motor having a rotating drive shaft operated by hydraulic fluid received from said fluid reservoir and having means for providing regenerative hydraulic fluid back to said pneumatically driven fluid pump; and c) providing an electric generator rotatably driven by said rotating drive shaft of said hydraulic motor and having electrical output leads, one of said leads connected to provide electrical power to said air compression means.

4. A hybrid method for generating electrical power according to claim 3, wherein said electric generator is a direct current electric generator or an alternating current electric motor.

5. A hybrid method for generating electric power according to claim 3 including the step of initially providing electric power to said air compression means until said storage tank begins to release compressed air to said hydraulic fluid pump.

6. A hybrid electric power generator, comprising:

a compressed air storage arrangement including an air compressor and a storage tank, said air compressor having connection means for providing compressed air to said storage tank;

a hydraulic system including a hydraulic fluid reservoir; a pneumatically driven hydraulic fluid pump and a hydraulic motor, said hydraulic fluid pump having connection means for controllably receiving compressed air from said storage tank to actuate said hydraulic fluid pump to pump hydraulic fluid under pressure to actuate said hydraulic motor to thereby rotate the drive shaft of said motor, said hydraulic system having means for providing regenerative hydraulic fluid back to said hydraulic fluid pump; and an electric generator acted by said drive shaft of said hydraulic motor, said generator having electrical power output leads, one of said leads providing electrical power to said air compressor.

7. A hybrid electric power system according to claim 6, further including an electrical regulator for regulating said electrical power to an electrical load and to said air compressor.

8. A hybrid electric power system according to claim 7, wherein said electric generator is a direct current electric generator or an alternating current electric generator.

9. A hybrid electric power system according to claim 8, wherein said electrical load is a motorized vehicle.

10. A hybrid electric power system, comprising:

an air compression system comprising an air compressor and a storage tank, said air compressor connected to provide compressed air to said storage tank;

a hydraulic system comprising a hydraulic fluid reservoir, a pneumatic driven hydraulic fluid pump and a hydraulic motor, said hydraulic fluid pump operated by said compressed air from said storage tank to pump hydraulic fluid to said hydraulic motor to thereby rotate the drive shaft of said hydraulic motor;

an electric generator driven by said drive shaft of said hydraulic motor; and wherein said electrical generator includes means for providing electrical power to said air compressor.

11. A hybrid electrical power system according to claim 10 wherein said hydraulic motor includes means for providing hydraulic fluid back to said hydraulic pump.

12. A hybrid electrical power system according to claim 11 wherein said storage tank includes means for controllably releasing said compressed air to said hydraulic fluid pump.

13. A hybrid electric power system according to claim 12 further including an electrical regulator for regulating said electrical power to said load and to said air compressor and said electric generator is a direct current electric generator or an alternating current electric motor.

* * * * *